（12） United States Patent
Jamieson et al.

(10) Patent No.: US 7,095,488 B2
(45) Date of Patent: Aug. 22, 2006

(54) SYSTEM FOR PROFILING OBJECTS ON TERRAIN FORWARD AND BELOW AN AIRCRAFT UTILIZING A CROSS-TRACK LASER ALTIMETER

(75) Inventors: James R. Jamieson, Savage, MN (US); Mark D. Ray, Burnsville, MN (US); Joseph T. Pesik, Eagen, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 474 days.

(21) Appl. No.: 10/347,908

(22) Filed: Jan. 21, 2003

(65) Prior Publication Data

US 2004/0141170 A1 Jul. 22, 2004

(51) Int. Cl.
*G01C 3/08* (2006.01)
*G01C 1/00* (2006.01)
*G01B 11/26* (2006.01)

(52) U.S. Cl. .................................. 356/5.01; 356/141.1
(58) Field of Classification Search ....... 356/5.01–5.08, 356/141.1
See application file for complete search history.

(56) References Cited

U.S. PATENT DOCUMENTS

| 4,572,662 | A |   | 2/1986 | Silverman |
| 4,635,203 | A | * | 1/1987 | Merchant |
| 5,313,263 | A |   | 5/1994 | Abbiss et al. |
| 5,465,142 | A |   | 11/1995 | Krumes et al. |
| 5,557,397 | A | * | 9/1996 | Hyde et al. ................. 356/5.01 |
| 5,835,199 | A | * | 11/1998 | Phillips et al. ............. 356/5.03 |
| 5,847,815 | A |   | 12/1998 | Albouy et al. |
| 6,163,372 | A | * | 12/2000 | Sallee et al. ................. 356/5.1 |
| 6,556,282 | B1 | * | 4/2003 | Jamieson ................... 356/4.01 |
| 2003/0043058 | A1 | * | 3/2003 | Jamieson |

FOREIGN PATENT DOCUMENTS

EP  0609162 A2  1/1994
JP  2000180100  6/2000

OTHER PUBLICATIONS

Publication from Optech Website dated Oct. 8, 2002, entitled Laser–Based Ranging, Mapping and Detection System (11 pgs.).
S.C. Cohen, "Geodynamics Laser Ranging System: Performance Simulations and Development of The EOS Facility" Proceedings of IGARSS '88 Symposium Aug. 13–Aug. 16, 1988.

* cited by examiner

*Primary Examiner*—Bernarr E. Gregory
*Assistant Examiner*—Brian Andrea
(74) *Attorney, Agent, or Firm*—Calfee, Halter & Griswold LLP; James M. Rashid, Esq.

(57) ABSTRACT

A forward looking cross-track laser altimeter comprises: a first configuration of optical elements for guiding pulsed laser beams along a first optical path; a mirror element coupled to a scanner and disposed in the first optical path, the scanner operative to oscillate the mirror element to sweep the reflected laser beams back and forth across a line at a predetermined frequency; the scanner and mirror element configurable to reflect the pulsed laser beams along paths forward and downward at a predetermined angle to the flight path of the aircraft, wherein the pulsed laser beam paths are caused to be line swept across a ground track forward the aircraft; the mirror element for receiving returns of the pulsed laser beams from the terrain and objects on the terrain forward the aircraft and reflecting the returns along a second optical path to a light detector which produces a return signal in response thereto; a first circuit governed by the return signals for measuring times-of-flight of the returns and generating time-of-flight signals corresponding thereto; the scanner for generating a line sweep position signal; and a second circuit for generating for each return a data profile comprising range and line sweep position thereof based on the corresponding time-of-flight and position signals.

33 Claims, 5 Drawing Sheets

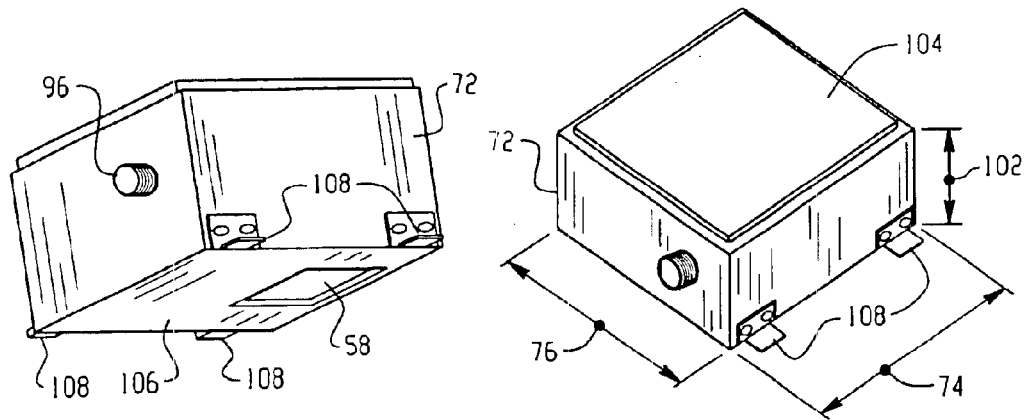
Fig. 5A  Fig. 5B
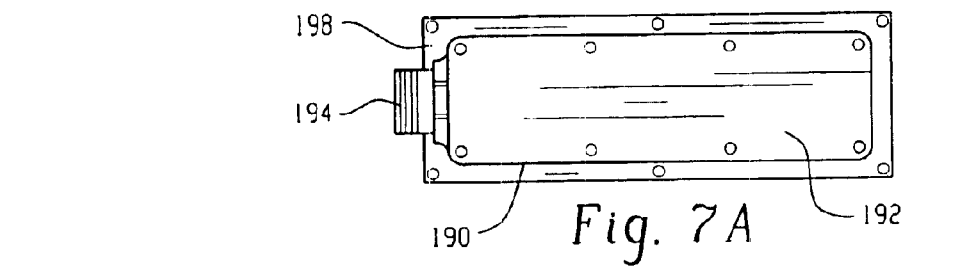
Fig. 7A
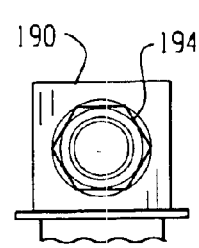
Fig. 7C
Fig. 7B
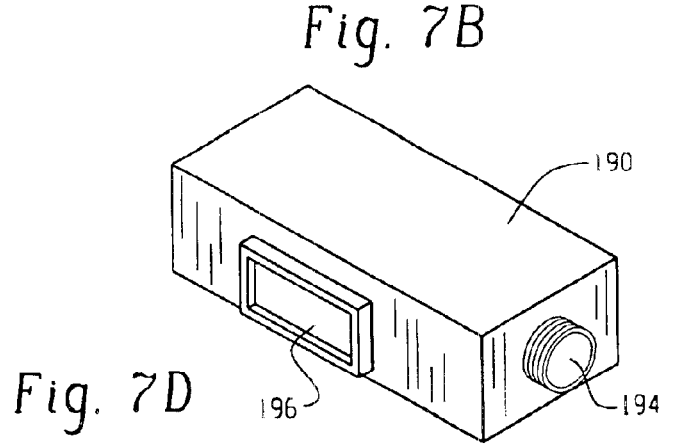
Fig. 7D

SYSTEM FOR PROFILING OBJECTS ON TERRAIN FORWARD AND BELOW AN AIRCRAFT UTILIZING A CROSS-TRACK LASER ALTIMETER

BACKGROUND OF THE INVENTION

The present invention is directed to avionic systems for measuring height above ground level for terrain avoidance during flight and landing in general, and more particularly, to a system for profiling objects on the terrain forward and below the aircraft utilizing a cross-track laser altimeter to avoid collision therewith during flight and landing.

Today's military and commercial aircraft desire more precise measurements of aircraft position and position information. Ground based RADAR systems and Global Positioning Systems (GPS) allow for precise positioning of an aircraft in latitude and longitude desirable for air traffic control, aircraft separation, and navigation. However, precise measurements of altitude are often difficult to achieve with such systems, especially for applications in which precise placement above ground is needed. New levels of precision for altitude measurements, on the order of +/−6 inches (15 cm), for example, are often required for flight profiles ranging from hover, to nap of the earth (NOE) flight, and autonomous landing.

Although a GPS has the ability to determine altitude of the aircraft, without a differential GPS receiver, precision above ground level (AGL) information is not possible due to the approximations in the GPS altitude estimation and the particular geodetic datum used. Systems have been developed to augment this limitation in GPS AGL accuracy by referencing GPS latitude and longitude to a terrain elevation map stored digitally in the avionics. With GPS alone, AGL accuracy can be on the order of 20 feet or more, but adding the digital terrain map reference allows for compensation to a suitable AGL measurement for navigation. However, such an augmented system does not provide for other information, such as the presence of trees and other ground objects, for example, which is critical for avoiding collisions during hover and NOE flight conditions.

Commercial and military aircraft often employ a barometric pressure altimeter for a common altitude reference measurement. With known airport ground level elevations relative to sea level, navigation of an aircraft during landing can be easily accomplished using barometric pressure altitude readings to establish height above the ground level of the airport. With this system, AGL accuracy is commonly on the order of units of feet. However, this technique does not account for ground features such as buildings, power lines, and other ground objects resulting in separation differences between the object, ground, and aircraft.

In each case, these AGL measurements are often insufficient for manned or unmanned aircraft flight profiles when exact AGL distancing is required. Further, digital terrain and object mapping data used in navigation may not always reflect changes in terrain, buildings, or other ground obstacles.

For military applications, it is sometimes necessary for aircraft to minimize the height above ground during flight to avoid detection. Thus, military aircraft, especially unmanned air vehicles (UAVs), that fly near the terrain for mission execution or autonomous landing require sensory data to not only accurately measure height above ground, but also height above ground objects as well. To address this problem in cruise missiles and other unmanned aircraft, radar altimeters were developed and employed to operate in radio frequency (RF) bands in frequency modulated (FM) continuous wave (CW) and pulsed, time of flight systems. Using a time of flight technique, radar altimeters transmit a radar pulse towards the ground and receive a reflection of the transmitted pulse from the ground. Range or distance R from the aircraft to the ground feature is determined from a formula $R=c*T/2$, where c is the speed of light, and T the measured round trip time of flight of the radar pulse.

Although radar altimeters are widely used to measure AGL height for pilot reference, they often do no provide the necessary spatial resolution required by the aircraft guidance and control systems for autonomous landings or control. With these commonly available systems today, AGL measurement precision can vary from 1–3%, which is primarily a result of the radiated pulse beam width, often having a solid angle as large as units of degrees. Also, as the pulsed beams strike the uneven terrain surface, different AGL heights are measured, which affect the precision of the overall aircraft AGL height measurement, the accuracy of which being a function of AGL height. In these systems, careful attention to installation of the radar altimeter to the aircraft is also needed to ensure isolation of the radiated field and so that multi-path secondary reflections do not confuse the receiver electronics. This multi-path interaction between the aircraft and the radar altimeter combined with the requirements for field isolation result in a limited number of locations on the aircraft where the device may be installed for practical applications of use.

Accordingly, a system is needed to measure height of the aircraft above ground including ground objects with the desired precision for autonomous control and landings, especially for UAVs. The present invention overcomes the drawbacks of the present systems and provides for the profiling of ground objects for use in determining the AGL height precision desired utilizing a cross-track laser altimeter.

SUMMARY OF THE INVENTION

In accordance with one aspect of the present invention, a forward looking cross-track laser altimeter disposable on-board an aircraft for profiling objects on terrain forward of the aircraft comprises: a laser source for generating pulsed laser beams at a predetermined rate; a first configuration of optical elements for guiding the pulsed laser beams along a first optical path; a scanner; a mirror element coupled to the scanner and disposed in the first optical path to reflect the pulsed laser beams, the scanner operative to oscillate the mirror element to sweep the reflected laser beams back and forth across a line at a predetermined frequency; the scanner and mirror element configurable to reflect the pulsed laser beams along paths forward and downward at a predetermined angle to the flight path of the aircraft, wherein the pulsed laser beam paths are caused to be line swept across a ground track forward the aircraft; the mirror element for receiving returns of the pulsed laser beams from the terrain and objects on the terrain forward the aircraft and reflecting the returns along a second optical path; a light detector; a second configuration of optical elements for guiding the returns from the second optical path to the light detector which produces a return signal in response to a detection of each return; a first circuit coupled to the light detector and governed by the return signals for measuring times-of-flight of the returns and generating time-of-flight signals corresponding thereto; the scanner for generating a position signal representative of a position of the laser beam in the line sweep; and a second circuit coupled to the scanner and first circuit for generating for each return a data profile comprising range and line sweep position thereof based on the corresponding time-of-flight and position signals.

In accordance with another aspect of the present invention, a laser-based system disposed on-board an aircraft for profiling objects on the terrain forward of the aircraft during flight for use in the guidance and control of the aircraft comprises: a forward looking cross track laser altimeter operative to emit pulsed laser beams at a predetermined rate along line swept paths forward and downward at a predetermined angle to the flight path of the aircraft, the pulsed laser beams being line swept back and forth across a ground track forward the aircraft and as the aircraft moves along its flight path, the line sweeps serpentining an area of terrain forward the aircraft, the laser altimeter for receiving returns of the pulsed laser beams from the terrain and objects on the terrain in the area forward the aircraft; the laser altimeter operative to measure times-of-flight and line sweep positions of the returns and generate for each return a data profile comprising range and line sweep position thereof based on the corresponding time-of-flight and position measurements, the data profiles being output from the laser altimeter; a first unit coupled to the laser altimeter for receiving the return data profiles and for assembling the data profiles of a predetermined number of consecutive line sweeps to form composite data of a three-dimensional image of a first predetermined area of terrain forward the aircraft, the composite data of the three dimensional image including data of terrain contours and object profiles on the terrain; a memory storing a terrain contour data base; a second unit coupled to the first unit for accessing the memory to retrieve terrain contour data comprising terrain contour data of a second predetermined area substantially consistent with the boundaries of the first predetermined area, and for comparing data of the first and second predetermined areas to identify object profiles on the terrain in the first predetermined area for use in the guidance and control of the aircraft.

In accordance with yet another aspect of the present invention, a laser-based system disposed on-board an aircraft for identifying a target concealed by a common object on the terrain from a plan view of the common object from the aircraft during flight comprises: a forward looking cross track laser altimeter operative to emit pulsed laser beams at a predetermined rate along line swept paths forward and downward at a predetermined angle to the flight path of the aircraft, the pulsed laser beams being line swept back and forth across a ground track forward the aircraft and as the aircraft moves along its flight path, the line sweeps serpentining an area of terrain forward the aircraft, the laser altimeter for receiving returns of the pulsed laser beams from the common object, the target concealed thereby and surrounding terrain in the area forward the aircraft; the laser altimeter operative to measure times-of-flight and line sweep positions of the returns and generate for each return a data profile comprising range and line sweep position thereof based on the corresponding time-of-flight and position measurements, the data profiles being output from the laser altimeter; and a first unit coupled to the laser altimeter for receiving the return data profiles and for assembling the data profiles of a predetermined number of consecutive line sweeps to form composite data of a three-dimensional image of the common object and target concealed thereby for each of a plurality of different approach flight paths, wherein each three-dimensional image providing a view orientation of the common object and target concealed thereby based on the corresponding approach flight path associated therewith; the first unit for integrating the composite data of the different viewed three-dimensional images to form a comprehensive three dimensional image of the common object and target concealed thereby, and for identifying the concealed target from the comprehensive three dimensional image.

In accordance with yet another aspect of the present invention, a laser altimeter disposable on-board an aircraft for profiling objects on terrain forward of the aircraft during flight comprises: a laser source for generating pulsed laser beams at a predetermined rate; a first configuration of optical elements for guiding the pulsed laser beams along a first optical path and including an optical element configurable to direct the pulsed laser beams from the first optical path to paths forward and downward at a predetermined angle to the flight path of the aircraft, wherein the pulsed laser beam paths are guided along a path on the terrain forward the aircraft; the optical element for receiving returns of the pulsed laser beams from the terrain and objects on the terrain along the terrain path forward the aircraft and directing the returns along a second optical path; a light detector; a second configuration of optical elements for guiding the returns from the second optical path to the light detector which produces a return signal in response to a detection of each return; a first circuit coupled to the light detector and governed by the return signals for measuring times-of-flight of the returns and generating time-of-flight signals corresponding thereto; and a second circuit coupled to the first circuit for generating data profiles for the returns, each data profile comprising a range based on the time-of-flight signal of the corresponding return.

BRIEF DESCRIPTION OF THE DRAWINGS

FIGS. 5A and 5B are illustrations of different isometric views of the enclosed housing for the laser altimeter.

FIGS. 7A–7D illustrate various views of an enclosed housing for an alternate non-scanning laser altimeter embodiment in accordance with the principles of the present invention.

DETAILED DESCRIPTION OF THE INVENTION

Figure 1:
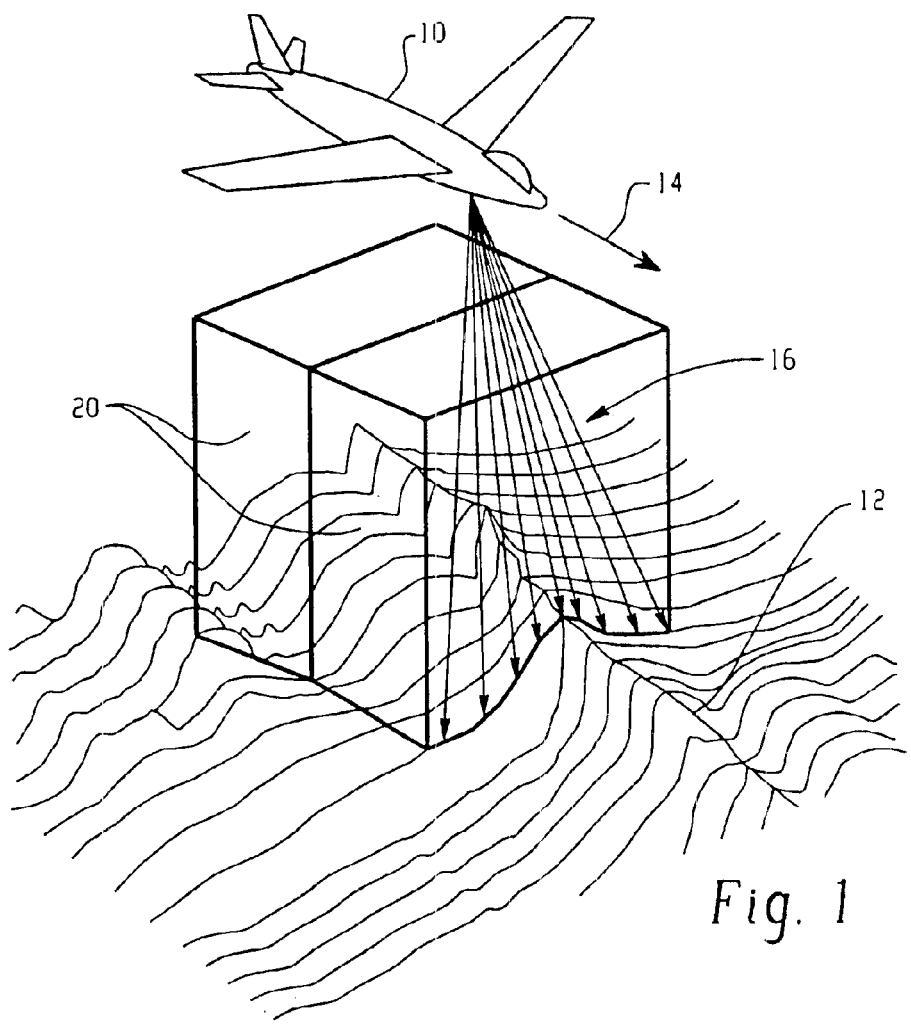
FIG. 1 is an illustration of an aircraft on-board which is disposed a laser altimeter operative to profile objects on terrain forward and below the aircraft in accordance with the principles of the present invention.

FIG. 1 is an illustration of an aircraft 10, which may be an UAV, for example, on-board which a cross-track laser altimeter (not shown) is disposed. In FIG. 1, the aircraft 10 is shown flying over terrain 12 which may include ground objects projecting above the ground level in the flight path designated by the arrowed line 14. The on-board laser altimeter transmits pulsed laser beams on the order of 2 milliradians, for example, designated by the arrowed lines 16, from the aircraft 10 towards the ground or terrain 12. As will become more evident from the following description, the laser altimeter scans the pulsed laser beams 16 back and forth across a path 17 substantially perpendicular to the ground track 18 of the aircraft which is shown more clearly in the simple sketch of FIG. 2. This scanning is known as cross-track scanning, which results in the name cross-track laser altimeter. The laser altimeter uses a time of flight technique in a real time environment for gathering AGL range data of terrain and objects above the terrain suitable for aircraft flight navigation, control and data analysis. This technique may also be used without a scanner for straight, line of sight range or distance measurement of objects above ground level.

In a forward looking view configuration of the laser altimeter, the pulsed beams 16 are transmitted at a predetermined angle, like on the order of 15°–45° to the flight path 14 of the aircraft 10, for example, so that a range or distance to ground objects in advance of the aircraft may be determined to augment flight controls of the aircraft for collision avoidance, for example. In a downward looking view mode, the pulsed beams 16 are transmitted substantially perpendicular to the ground 12 to determined the instantaneous AGL height. As the aircraft 10 moves forward in time, the pulsed beams 16 are scanned across the ground track 18 in a serpentine or sinusoidal pattern so that a two dimensional terrain/object profile is swept by this cross scanning to the ground track 18. As the aircraft progresses in time, a 3 dimensional, real-time spatial data set is created by the present embodiment of the invention. For each position of scanned beam 16 in time, position information is logged, time of flight of the laser pulse is recorded, and a ground/object height profile data set assembled. The accumulated data from the sinusoidal sweep of the laser scanner contains position information of objects on the ground relative to the body axis of the aircraft 10.

Combining this information with GPS and inertial navigation information obtained from aircraft avionics permits the geo-location of land features, man-made or naturally occurring, and the detection and definition of safe flight volumes (SFVs) 20 which are defined for the present embodiment as three dimensional spaces forward and/or below the aircraft 10 containing no obstructions (see FIG. 1). The GPS and inertial data are also used by the present embodiment to compensate for bank or pitch attitude angles of the aircraft 10. The foregoing described information may be used to provide inputs to a flight control system of the aircraft 10 in real-time to avoid collisions with ground features that may represent a potential flight hazard at a future point in time as the aircraft 10 progresses forward. In addition, the ground height profile data sets may be used to interrogate terrain features such as valleys or mountains. This laser altimeter technology presents a significant advancement over radar altimeters as the ground registered data contains a higher level of resolution due to the narrow beam of the laser. The present system may be configured in a mono-static or bi-static laser altimeter approach for scanning or non-scanning applications. All of these aspects will be explained in greater detail herein below.

Figure 2:
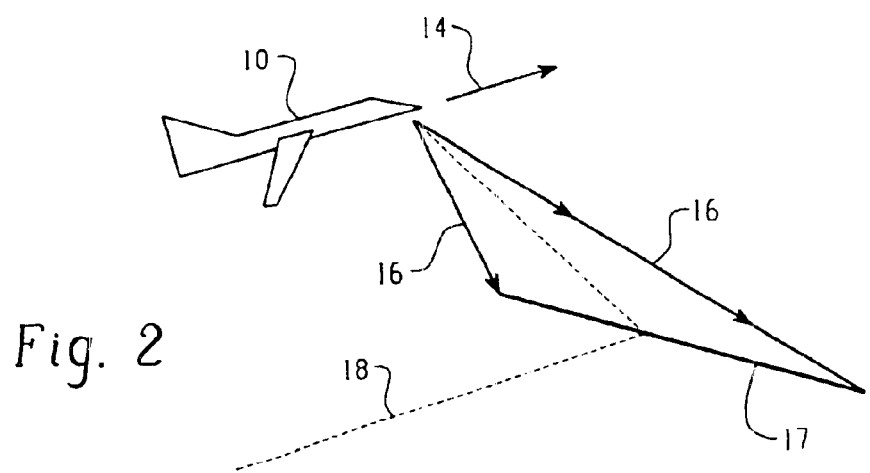
FIG. 2 is an illustration of cross-track scanning of the laser altimeter on-board the aircraft of FIG. 1.
Figure 3:
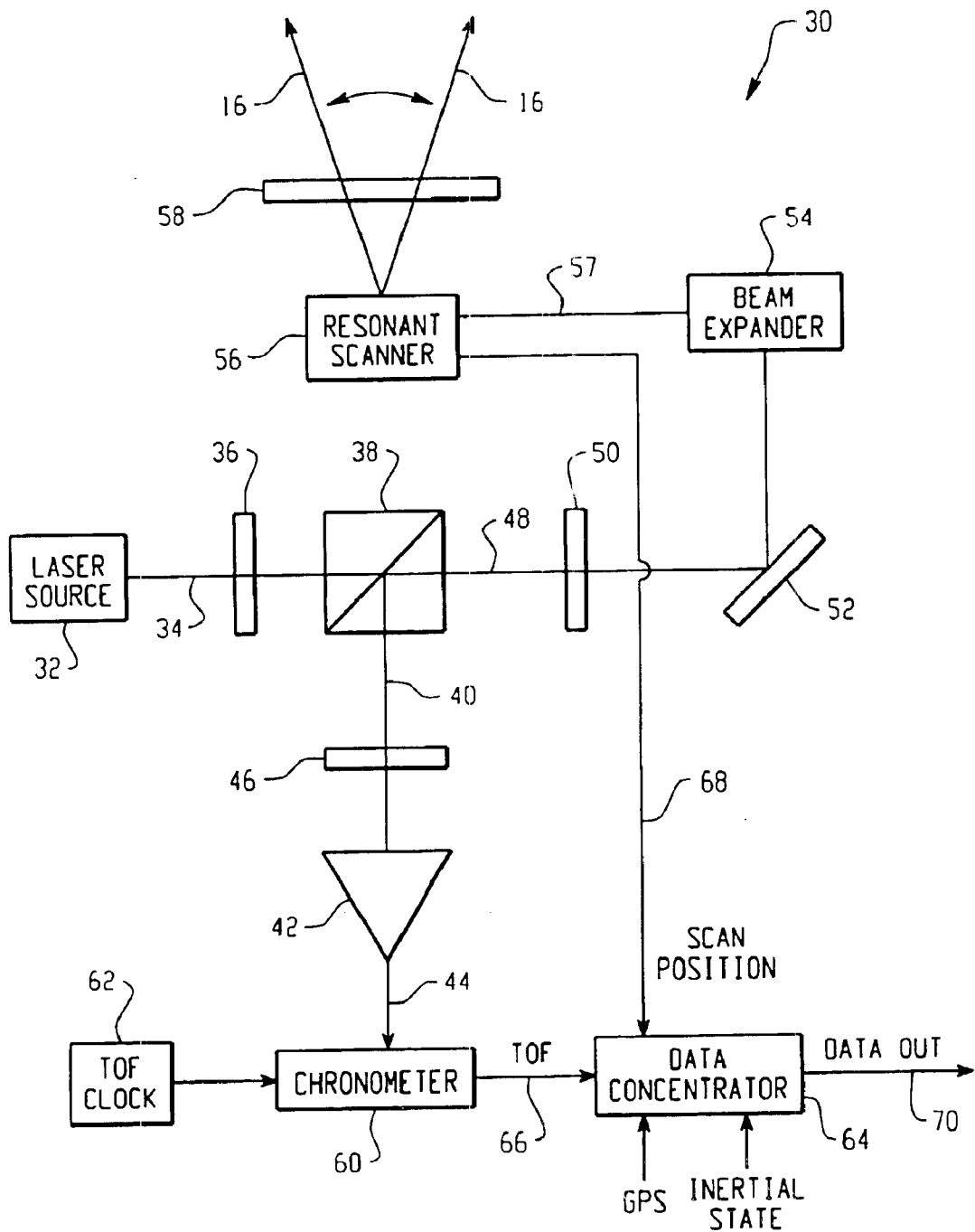
FIG. 3 is a block diagram schematic of an exemplary embodiment of a laser altimeter suitable for use on-board an aircraft in accordance with the principles of the present invention.

FIG. 3 illustrates an exemplary embodiment of a cross-track laser altimeter 30 suitable for use on-board the aircraft 10 of FIGS. 1 and 2. The embodiment of FIG. 3 comprises a mono-static configuration of optical paths, but may be modified to a bi-static configuration as will become apparent from the following description without deviating from the broad principles of the present invention. Referring to FIG. 3, a laser source 32 generates laser pulses at a predetermined rate, like in the range of approximately 8K–10K pulses per second (PPS), for example, over an optical path 34. The laser pulses may be linearly polarized with a pulse width on the order of 0.8 nanoseconds, for example. The laser source 32 may comprise a passively Q switched autonomously operated microchip laser of the type manufactured by Northrup Gruman, PolySci, bearing model no. DEM 1064, for example. While this laser source generates the laser beam substantially at a wavelength of approximately 1064 nanometers (nm), it is understood that laser beams of other wavelengths may be used in the present embodiment just as well. For example, the laser source 32 may generate laser beams at an eye safe wavelength which may be on the order of 1.5 micrometers.

A collimating lens 36 may be disposed in the path 34. The pulsed laser beam emitted from the laser source 32 expands to approximately 4 millimeters (mm) before being collimated by the lens 36 which passes the collimated beam to a polarizing beam splitting cube 38. A small portion of the pulsed laser beam is split off in the cube 38 and directed over an optical path 40 to a light detector 42, which may be an avalanche photodetector, for example, which generates a start pulse over signal line 44 in response thereto. An optical filter element 46 may be disposed in the optical path 40 to pass light substantially at the wavelength of the generated laser beam. The balance of the laser beam is passed through the cube 38 and directed along an optical path 48 to a quarter-wave optical element 50 in which the beam is converted to circular polarization. In the present embodiment, a fold mirror 52 is disposed in the path 48 to direct the circular polarized beam from path 48 to a beam expander 54 that has been folded into a penta-prism architecture as will be more fully described in connection with the embodiment of FIG. 4 supra. The expanded beam, which may be magnified by a predetermined magnification, like approximately 10× in diameter, for example, leaves the expander 54 along an optical path 57 and enters a scanner 56, which may be a resonant scanner, for example.

The resonant scanner 56 may be configured to sweep the beam along a downward path which is at an angle to the flight path of the aircraft. The downward angle may be adjustable between 15° to 45°, for example, for a forward looking view. The beam designated by the arrowed lines 16 is emitted from the bottom of the aircraft or UAV 10 through a flush window 58 at the downward angle to the flight path. With the beam directed at the downward angle, it is swept back and forth at a rate of 100 Hz or approximately 200 lines per second via the resonant scanner 56 in the cross-track direction from +/−10 degrees to up to +/−30 degrees in relation to the ground track of the aircraft as shown in FIG. 2. Echo return signals reenter the laser altimeter 30 through window 58 and are directed back to the cube 38 along the same optical paths as used for the transmitted pulses, i.e. mono-static configuration, except that the echo or return pulses are reconverted to linear polarization in element 50 in a reverse linear polarization to the transmitted pulse. At the cube 38, the return pulses are re-directed along path 40, through the optical filter 46 to the avalanche photodiode detector 42 which produces return or stop pulses over line 44 in response thereto.

Signal line 44 is coupled to a chronometer 60 which, in one embodiment, may be driven by a time-of-flight (TOF) clock 62. The time of flight for each return pulse is determined in chronometer 60 based on the advancement of an internal clock driven by the TOF clock pulses between corresponding start and stop pulses from line 44. The resulting digital TOF code of the internal clock may be recorded in the chronometer 60. Alternatively, the chronometer 60 may include a capacitor which is charged to a voltage between the start and stop pulses. The resulting voltage across the capacitor at the stop pulse is converted to a digital code which may be 16 bits, for example, by an analog-to-digital converter (A/D). The resulting digital TOF code of the A/D may be recorded in the chronometer 60 which may be of the type manufactured by E-O Devices, bearing model no. ECH-2, for example.

In either embodiment, range to an object is then determined from the digital TOF data recorded in the chronometer 60. The TOF data is provided to a data concentrator 64 over signal lines 66 along with a scan position signal over line 68 from the resonant scanner 56. The data concentrator 64 determines the range for each echo return from the corresponding TOF data thereof and gathers the range and position data for all of the points (returns) along each line sweep to form return data profiles from which above ground objects forward of the aircraft may be determined. For the present embodiment, range accuracy for each point is on the order of 6 inches or better. Information regarding the aircraft location (lat/lon), via an on-board GPS receiver, and inertial state via an on-board INS computer, is also provided to the data concentrator 64 for the return data profiles. From the collected data, the data concentrator 64 may compute compensated height of ground objects based on aircraft roll and/or pitch attitude, for example. The return data profiles are output from the concentrator 64 over line 70, preferably to the aircraft bus from which it may be obtained from the other systems of the aircraft as will become more evident from the description found herein below.

While the embodiment of FIG. 3 comprises a mono-static optical path configuration, it is understood by all those skilled in the pertinent art, that such an embodiment may be modified to permit a bi-static optical path configuration without deviating from the broad principles of the present invention. For example, in a bi-static configuration, the laser source 32 may provide the pulsed laser beams along one path to the beam expander 54 and resonant scanner 56 and echo returns received from the scanner 56 and expander 54 may be directed along a separate optical path to filter 46 and detector 42. In such an embodiment, certain elements of the mono-static configuration, like the beam splitter cube 38, for example, may not be needed and the optical paths may take the form of fiber optic cables, for example.

Figure 4:
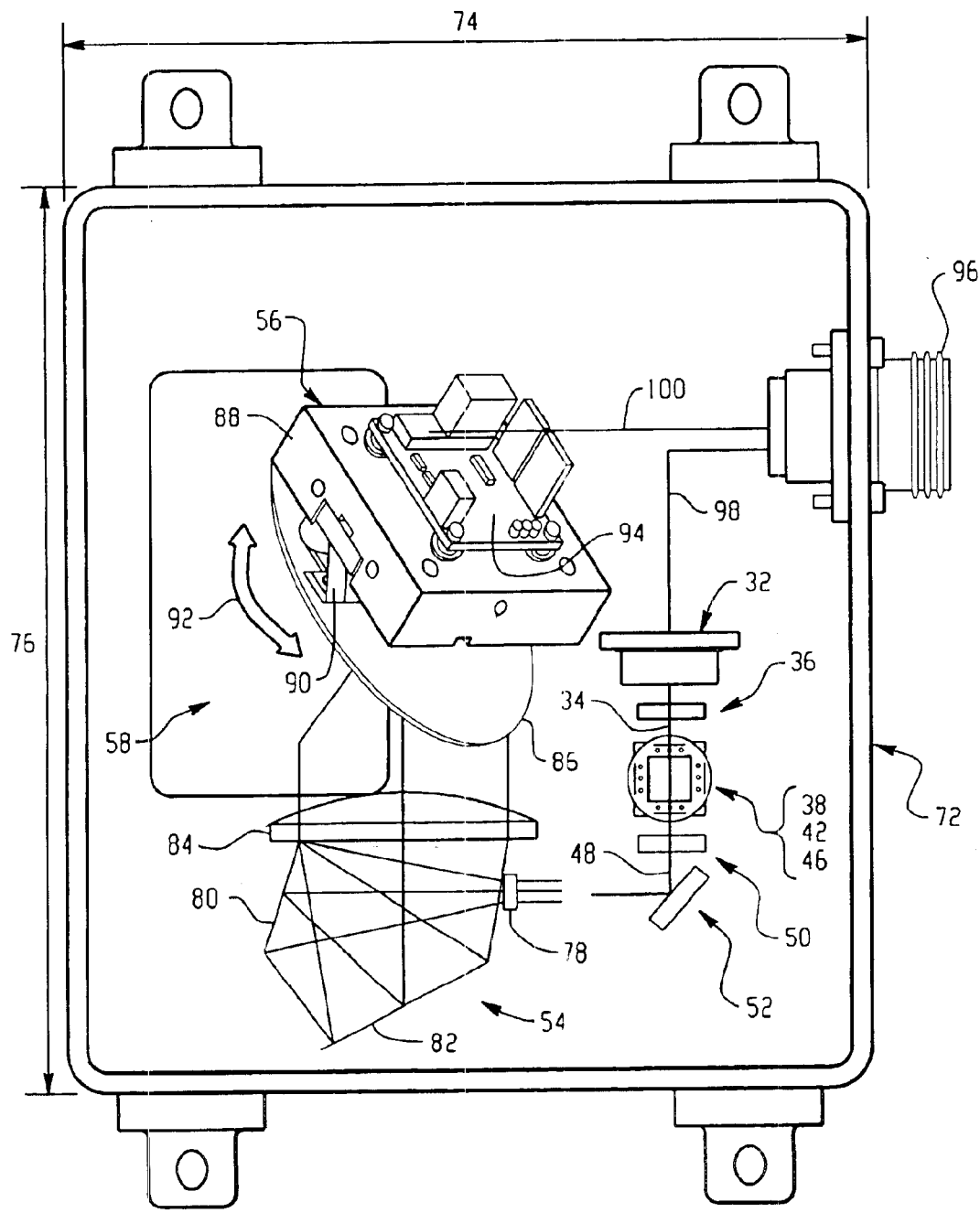
FIG. 4 is an illustration of an exemplary laser altimeter embodiment packaged in a small enclosed housing suitable for mounting to an aircraft.

FIG. 4 is an illustration of an exemplary packaging of the laser altimeter embodiment in an enclosed housing 72 having outside side dimensions of 74 and 76, which may be approximately six inches or 15 centimeters each, for example. Reference numerals for the elements already described for the embodiment illustrated in FIG. 3 will be kept the same. Referring to FIG. 4, within the housing 72, the optical elements 32, 36, 38, 50 and 52 are mounted to an optical bench (not shown) and fixedly aligned along their respective optical paths 34 and 48. In this embodiment, the elements 42 and 46 are fixedly aligned and coupled together with element 38 in a common assembly. As noted above the beam expander 54 may be folded into a penta-prism configuration. In this configuration, the circularly polarized beam reflected by the fold mirror 52 enters a plano-convex lens 78 and is expanded thereby. The expanding beam is directed to a first fold mirror 80 which reflects the expanding beam to a second fold mirror 82 which again reflects the expanding beam to another plano-convex lens 84. Note that the beam continues to expand in diameter until it reaches the second plano-convex lens 84 wherein it is re-collimated and directed to a mirrored element 86 of the resonant scanner 56. The optical elements of the beam expander 54 and resonant scanner 56 may be mounted to the optical bench and fixedly aligned to provide the optical paths as described hereabove and shown in FIG. 4.

The mirrored element 86 of the resonant scanner 56 may be of the type described in the co-pending U.S. patent application Ser. No. 10/056,199, filed Jan. 24, 2002, entitled "Silicon Wafer Based Rotatable Mirror" and assigned to the same assignee as the instant application, which co-pending application being incorporated by reference herein for providing the mirrored element in greater detail. In the present embodiment, the mirrored element 86 may comprise a brass backplate for attaching the element 86 to an electro-mechanical resonator unit 88 which may be of the push bar solenoid type manufactured by LaseSys Corp., under the model no. URS-E-100, for example. The mirrored element 86 via the brass backplate may be mounted to the resonator unit 88 by a plurality of spring loaded mounting arms 90 and is operated by a pair of voice coils in the unit 88 to resonate or oscillate back and forth along the path of the arrowed line 92, for example.

When housing 72 is mounted to the aircraft, the resonant scanner and mirror element are configurable in the housing 72 such that the pulsed laser beams 16 are reflected from the mirrored element 86 through the window 58 in the housing 72 and scanned along paths forward and downward at a predetermined angle to the flight path of the aircraft, wherein the pulsed laser beam paths are caused to be line swept in a cross-track motion in relation to the flight of the aircraft as described herein above. Accordingly, the mirror element 86 receives returns of the pulsed laser beams from the terrain and objects on the terrain forward the aircraft and reflects the returns back to the optical elements of the laser altimeter for downstream processing thereof.

In the embodiment of FIG. 4, a printed circuit (PC) board 94 may be mounted to the resonant scanner 56 and contain the circuits for determining the position of the scanner 56, TOF clock 62, the chronometer 60 and the data concentrator 64, for example. Power for the laser source 32 may be brought into the housing 72 through an electrical connector 96 over power lines 98. Also, power for the PC board circuits, GPS signals and INS signals for the data concentrator 64 may be brought into the housing 72 through the connector 96 over lines 100 and the data output from the data concentrator 64 may exit the housing 72 over lines 100 as well.

Accordingly, the entire laser altimeter 30 may be packaged in a very small enclosed housing 72 which may be 15 cm on each side 74 and 76 with a depth dimension 102 which may be approximately 3.5 in. or 8.75 cm, for example. The enclosed housing 72 of the present embodiment is shown in different isometric views in FIGS. 5A and 5B. Referring to FIG. 5B, the top of the housing 72 is fully enclosed and sealed with a plate 104. In FIG. 5A, the windowed bottom 106 of housing 72 may be flush mounted to a bottom skin surface of the aircraft 10 using mounting pads 108 which project out from the bottoms of the sides of the housing 72. Holes are provided in the pads 108 for securing the housing 72 to the aircraft skin using screws or rivets, for example. An opening may be provided in the aircraft skin aligned with the windowed area 58 to allow the pulsed laser beams and their echo returns to pass from and be received by the laser altimeter 30.

Figure 6:
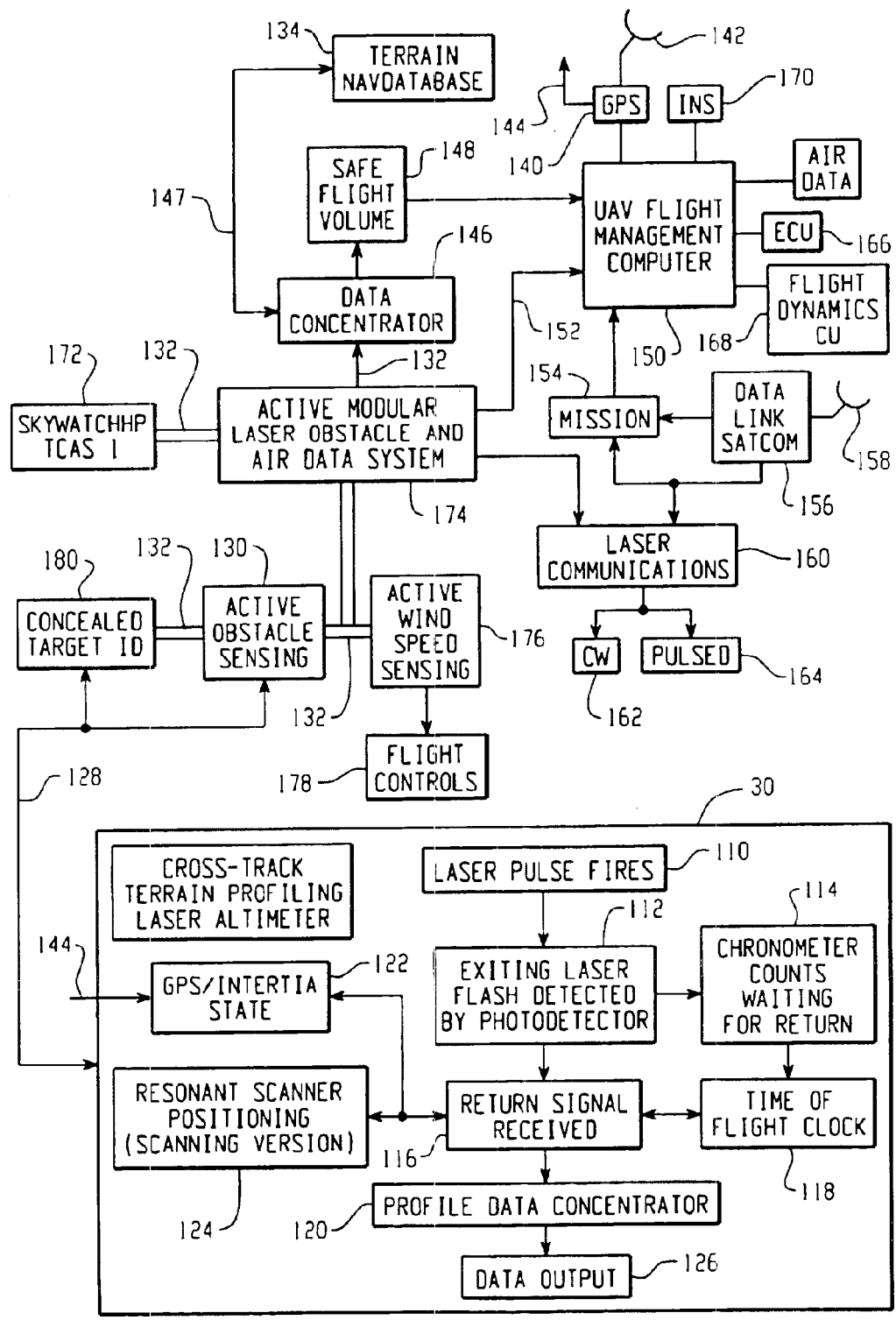
FIG. 6 contains an operational flow chart of an exemplary laser altimeter and a block diagram schematic of a system disposed on-board an aircraft and utilizing the laser altimeter for profiling objects on the terrain forward of the aircraft during flight for use in the guidance and control of the aircraft.

An exemplary operation of the laser altimeter 30 and how the return data profiles generated and output therefrom interface with other aircraft avionics will now be described in connection with a block flow chart shown in FIG. 6. Referring to FIGS. 3 and 6, in block 110, the laser source 32 fires laser pulses at a rate of 8K–10K pps, for example. In block 112, each exiting laser pulse is detected by the photo-detector 42 via chronometer 60 to count in block 114 based on the TOF clock which may have a clock rate on the order of $1 \times 10^9$ pps, for example. When a return or echo pulse is received by the photo-detector 42 in block 116, the count of the chronometer 60 is registered as a TOF datum for the corresponding pulse in block 118. Thereafter, in block 120, the data concentrator 64 generates a range from the TOF datum of each return or echo based on aircraft position via an on-board GPS receiver and compensated for inertial states of the aircraft, block 122. Each return pulse data profile comprises the position of the pulse in the scan obtained from the resonant scanner 56, block 124, and the compensated range thereof, for example. Preferably the data profiles are generated sequentially in an order corresponding to each line sweep of the pulsed laser beam and may be generated in real time as the corresponding return echoes are being produced. Accordingly, in block 126, a sequential stream of return data profiles is output from the laser altimeter 30 over line 128, preferably in real time at a rate of approximately 8K–10K data points per second, i.e. as they are being generated.

The stream of return data profiles over line 128 may be provided to an active obstacle sensing unit designated by block 130 which gathers and assembles the data profiles of a predetermined number of consecutive line sweeps to form composite data of a three dimensional (3-D) spatial image or data set of a first predetermined area of the ground scan. If the laser altimeter 30 directs its line scans forward of the aircraft, then the predetermined area will be forward of the aircraft. In the present embodiment, the sensing unit 130 assembles the data profiles of the most recent predetermined number of consecutive line sweeps. Accordingly, as the aircraft moves along its flight path, the spatial data set of the first predetermined area changes like a sliding window with aircraft movement, for example. Preferably, data profiles of consecutive line sweeps are always gathered and assembled by the unit 130 from the data stream to form a real time 3-D image of the first predetermined area which includes data of terrain contours and object profiles on the terrain. This assembled image is referred to herein as the cross-track scan image of the laser altimeter 30 and is used in the determination of the safe flight volume (SFV) 20 defined herein above in connection with FIG. 1. The ground/object profile data set of the scan image corresponding to the first predetermined area assembled by unit 130 is then output to the other aircraft avionics via the aircraft bus 132, preferably using a flight control data concentrator.

In the present embodiment, this ground/object image data set, which contains a higher level of resolution than radar derived data sets due to the narrow beam of the laser, is used by the aircraft avionics to provide inputs to the flight control system of the aircraft in real-time to avoid ground obstacles that may represent a potential flight hazard at a future point in time as the aircraft progresses forward. More specifically, the high resolution image scan profile data sets may be provided to a data concentrator 146 and used therein to augment/enhance the digital terrain contour data sets of a data base which may be stored on board the aircraft 10 in a memory 134, for example. This will become more evident from the following description.

A GPS receiver 140 is disposed on-board the aircraft and receives signals from the associated GPS satellite network by an antenna 142, and therefrom determines the instantaneous latitude and longitude (lat/lon) position of the aircraft 10. The GPS receiver 140 generates a position signal representative of the aircraft position over signal line 144 which may be coupled to the laser altimeter 30 for use in assembling the return data profiles. For example, an instantaneous aircraft position may be provided in the data stream with the data profiles of each line sweep. Accordingly, the sense unit 130 may utilize the return data profiles along with the associated instantaneous aircraft position data to establish a geographical location and latitude and longitude boundaries of each first predetermined area which is also passed along to the data concentrator 146.

In turn, the data concentrator 146 may utilize the geographical location and latitude and longitude boundaries of each first predetermined area to access the database of memory 134 via signal lines 147 to retrieve terrain contour data comprising terrain contour data of a second predetermined area of terrain substantially consistent with the geographic boundaries of the first predetermined area. Consequently, the terrain data set retrieved from memory 134 may be substantially congruent in area and geometry to the scan area data set assembled by unit 130. The two data sets are compared together in the data concentrator 146 to identify above ground object profiles and other terrain features of the first predetermined areas that are not in the terrain database of memory 134. The data concentrator 146 is also operative to integrate the data sets of the first and second predetermined areas to provide more detailed information of the terrain features and objects on the terrain to other aircraft avionics for use in the guidance and control of the aircraft as will become more evident from the following description.

This more detailed composite terrain/object information, which may be updated and augmented in real-time, may be used to safely optimize the aircraft height above ground data which is used along with other flight information to define the SFV in block 148. Each defined SFV data is provided to a flight management computer 150. Moreover, the integrated composite data set of above ground object profiles detected in block 146 may be provided to the computer 150 over signal lines 152 for use in an intelligent decision authority by the flight director by knowing in advance what potential obstacles are left or right of the flight path of the aircraft before a change in flight path is input. Also, advanced warning of changes in the object profiles or heights above ground may be determined in computer 150 from the data set of above ground objects and such changes may be directed to the aircraft flight control director for autonomous control.

If the aircraft 10 is a UAV, then prosecution of a desired mission change to the UAV is communicated to a mission function 154 coupled to the flight management computer 150 by commands through a satellite communication data link 156 including antenna 158, a laser communications module 160 including a CW laser receiver 162 and/or a pulsed laser receiver 164, an RF receiver, or other communication methods, for example. Upon acceptance of the command at the UAV, the flight management computer (FMC) 150 can interrogate the environment, planning and executing flight control settings to avoid contact with other ground objects. For example, the FMC 150 commands the Engine Control Unit (ECU) 166 and Flight Dynamics Control Unit (CU) 168 as necessary to satisfy the commanded mission relative to the GPS position which it receives from receiver 140, and the INS state which it receives from the an INS computer 170. Vehicle flight control laws are satisfied to maintain the mission command or request within the context of the Safe Flight Volume defined in block 148 and vehicle stability limits. The cross-track profiling system may either provide the FMC 150 with a new Safe Flight Volume each time the aircraft approaches the boundary of the current SFV or may provide a continuously updated SFV. The frequency of SFV update is based primarily on the aircraft speed and threat warning level of proximity. Moreover, the volume of SFV may be periodically updated and enlarged or shrunk depending on aircraft speed, maneuverability, altitude, density of objects, and height above ground determinations.

Other data measurements determined by on-board avionics systems may be included by the data concentrator 146 in establishing the SFV. For example, a traffic alert and collision avoidance system or TCAS 172, which may be of the type manufactured by Goodrich Avionic Systems and referred to as SKYWATCH®, for example, may determine other aircraft within a volume of space surrounding the aircraft. Such data may be communicated to the data concentrator 146 over the aircraft bus 132 to take into account such target aircraft when establishing the SFV. Another example is an active laser obstacle and air data system 174, which may be of the type described in the co-pending U.S. patent application Ser. No. 09/946,057, filed Sep. 4, 2001, entitled "Combined LOAS and LIDAR System", and assigned to the same assignee as the instant application, the co-pending application being incorporated by reference herein for providing greater details of the structure and operation thereof. The system 174 detects obstacles surrounding the aircraft 10 and provides data of the position thereof. Such obstacle data also may be provided over the aircraft bus 132 to the data concentrator 146 for use in defining the SFV. Yet another example is an active laser wind speed sensor 176, which may be of the type described in the co-pending U.S. patent application Ser. No. 09/946, 048, filed Sep. 4, 2001, entitled "System and Method Of Measuring Flow Velocity in Three Axes", and assigned to the same assignee as the instant application, the co-pending application being incorporated by reference herein for providing greater details of the structure and operation thereof. The sensor 176 senses the wind speed or velocity surrounding the aircraft and provides such data to flight controls 178 to assist in determining navigation for obstacle/terrain avoidance.

Further, since the cross-track profiling system is capable of producing a range accuracy of +/−6 inches (15 cm) or better, a concealed target ID detector unit 180 is included and operates to identify a target concealed by a common object. More specifically, when an aircraft flies over the common object on the terrain, like tree foliage, for example, a target under the canopy of the tree can not generally be seen from a plan view of the common object by the aircraft, and is therefore, considered concealed by the ground object. In the present embodiment, the unit 180 receives the return data profiles from the laser altimeter 30 over signal line 128, for example, and assembles the data profiles of a predetermined number of consecutive line sweeps forward the aircraft to form composite data of a 3-D scan image of the common object and target concealed thereby. The unit 180 assembles and forms the 3-D scan image for each of a plurality of different approach flight paths. This is possible due to the detection and timing of multiple laser radar returns from a single or common ground location. As the laser altimeter 30 sweeps the pulsed laser beam side to side, multiple returns may be generated by the foliage of trees, the ground, and objects between the ground and tree canopy, for example. Thus, by flying different flight vectors over the same ground location which may be determined by the GPS receiver 140, a dataset of elevation and position geo-located to a master ground reference such as a map, for example, may be constructed by the unit 180. Accordingly, each formed 3-D image provides a forward view orientation of the common object and target concealed thereby.

Unit 180 is further operative to integrate the different viewed 3-D images to form a comprehensive 3-D image of the common object which reveals the concealed target. This is due to the view orientation changing relative to the common object or foliage permitting detection of a portion of the concealed target in each flight direction or vector, the target being obscured or partially obscured from view in each of the different flight directions. When the views are combined in unit 180, the partially obscured target from the different views may be integrated and reconstructed into a complete or near complete image from which the unit 180 may identify the target. By tracking the common ground location or common object with aircraft lat/lon coordinates obtained from a signal generated from the GPS receiver 140, for example, and assembling and processing laser return data profiles based thereon, a comprehensive 3-D image of all the data collected may be constructed in unit 180. By sorting the data of the data stream 128 based on range or altitude, the data can be parsed to show only returns below the tree canopy revealing the concealed target, such as a tank or people, for example. This technique is useful in search and rescue operations of downed military pilots or uncovering terrorist cells operating out of remote jungle regions, for example.

As indicated above, another aspect of the present invention includes a non-scanning laser altimeter embodiment which includes much the same elements as described in connection with the scanning embodiment of FIG. 3 absent the resonant scanner 56. In this embodiment, the pulsed laser beam may pass directly from the beam expander 54, out the window 58, and directed in a forward and downward path towards the terrain below. Alternatively, a fold mirror may replace the scanner 56 to direct the beam from the expander 54 through the window 58 and downward from the aircraft along a path on the terrain forward the aircraft. The fold mirror may be steerable to direct the laser beams along different paths along the terrain, one of which being the ground track of the aircraft, for example. In either embodiment, the time of flight of the laser pulse or range is determined by the chronometer 60 as an above ground level measurement and provided to the flight management computer 150 (see FIG. 6), preferably over the aircraft bus 132. This measurement may be compensated for aircraft roll and pitch attitude in the data concentrator 64 as described herein above or, in the alternative, corrected for slant range angle in the flight management computer 150 to compensate for roll and pitch of the aircraft. As described above, the data concentrator 64 outputs a stream of return data profiles over line 128 to the active obstacle sensing unit 130.

However, in the non-scanning laser altimeter embodiment, the stream of return data profiles over line 128 does not represent a cross-track scan, but rather represents the terrain and objects on the terrain along a ground path consistent with the flight path of the aircraft. The unit 130 gathers and assembles a predetermined number of successive data profiles to form composite data of a three dimensional (3-D) spatial image or data set of a first predetermined ground path. If the non-scanning laser altimeter directs its laser beams forward of the aircraft, then the predetermined path will be forward of the aircraft. In the present embodiment, the sensing unit 130 assembles the data profiles of the most recent predetermined number of successive data profiles. Accordingly, as the aircraft moves along its flight path, the spatial data set of the first predetermined path changes like a sliding window with aircraft movement, for example. Preferably, data profiles of successive data profiles are always gathered and assembled by the unit 130 from the data stream to form a real time 3-D image of the first predetermined path which includes data of terrain contours and object profiles in the terrain path. The ground/object profile data set of the scan path corresponding to the first predetermined path assembled by unit 130 is then output to the other aircraft avionics via the aircraft bus 132, for example, for further processing therein.

A suitable housing 190 for the non-scanning laser altimeter embodiment is shown in various views in FIGS. 7A–7D. FIGS. 7A, 7B, and 7C shown the housing 190 in top, side and profile views, respectively, and FIG. 7D shows the housing 190 in an isometric view. Note that the elements of the laser altimeter may be sealed within the housing 190 by a top plate 192 which is affixed to the housing by a plurality of screws, for example. An electrical connector 194 is disposed at one side of the housing 190 for providing connections for electrical power and input and output signals therethrough. A windowed area 196 is disposed at the bottom of the housing for passing the laser beams from the housing and receiving echoes therefrom.

Referring to FIGS. 7A–7D, the housing 190 is approximately 7 inches or 17.5 cm in length, 2.25 in. or 5.6 cm in width and 2.5 in. or 6.25 cm in height, and includes an approximate 0.5 in or 1.25 cm lip 198 around the periphery of bottom plate thereof through which holes are provided to secure the housing 190 to the bottom skin surface of the aircraft by screws or rivets, for example. An opening is provided in the bottom skin surface aligned with the windowed area 196 for passing the laser beams 16 from the aircraft as shown in FIG. 1.

While the present invention has been described herein above through the use of various embodiments, it is understood that these embodiments are provided merely by way of example and are not intended to be limiting to the invention in any way, shape or form. Rather, the present invention should be construed in breadth and broad scope by the recitation of the claims appended hereto.

What is claimed is:

1. A laser-based system disposed on-board an aircraft for profiling objects on the terrain forward of the aircraft during flight for use in the guidance and control of the aircraft, said system comprising:

a forward looking cross track laser altimeter operative to emit pulsed laser beams at a predetermined rate along line swept paths forward and downward at a predetermined angle to the flight path of the aircraft, said pulsed laser beams being line swept back and forth across a ground track forward the aircraft and as the aircraft moves along its flight path, said line sweeps serpentining an area of terrain forward the aircraft, said laser altimeter for receiving returns of said pulsed laser beams from the terrain and objects on the terrain in said area forward the aircraft;

said laser altimeter operative to measure times-of-flight and line sweep positions of said returns and generate for each return a data profile comprising range and line sweep position thereof based on the corresponding time-of-flight and position measurements, said data profiles being output from the laser altimeter;

a first unit coupled to the laser altimeter for receiving said return data profiles and for assembling the data profiles of a predetermined number of consecutive line sweeps to form composite data of a three-dimensional image of a first predetermined area of terrain forward the aircraft, said composite data of the three dimensional image including data of terrain contours and object profiles on the terrain;

a memory storing a terrain contour data base;

a second unit coupled to said first unit for accessing said memory to retrieve terrain contour data comprising terrain contour data of a second predetermined area substantially consistent with the boundaries of the first predetermined area, and for comparing data of the first and second predetermined areas to identify object profiles on the terrain in the first predetermined area for use in the guidance and control of the aircraft.

2. The system of claim 1 wherein the laser altimeter is operative to receive a signal representative of aircraft position in latitude and longitude and to include the aircraft's position in the return data profiles.

3. The system of claim 2 wherein the laser altimeter is operative to include the aircraft's position with each line sweep of the return data profiles.

4. The system of claim 1 wherein the laser altimeter is operative to receive a signal representative of an inertial state of the aircraft and to include the aircraft's inertial state in the data profiles.

5. The system of claim 1 wherein the laser altimeter is operative to output the return data profiles in a data stream having a sequential order corresponding to each line sweep of the pulsed laser beam.

6. The system of claim 1 wherein the laser altimeter is operative to generate the data profiles sequentially in real time as the corresponding return signals are being produced.

7. The system of claim 6 wherein the laser altimeter is operative to output the data profiles sequentially in real time as they are being generated.

8. The system of claim 1 wherein the first unit is operative to assemble the data profiles of the most recent predetermined number of consecutive line sweeps to form composite data of a three-dimensional image of the first predetermined area of terrain which becomes a sliding window area of terrain along the ground track of the aircraft during flight.

9. The system of claim 8 wherein the laser altimeter is operative to receive a signal representative of instantaneous aircraft position in latitude and longitude and to include the aircraft's position in the return data profiles; and wherein the first unit is operative to establish a geographical location and latitude and longitude boundaries of the first predetermined area based on return data profiles and associated instantaneous aircraft position thereof.

10. The system of claim 9 including a global positioning system (GPS) receiver for providing a signal representative of the instantaneous position of the aircraft for use by the laser altimeter.

11. The system of claim 9 wherein the second unit is operative to access the memory to retrieve terrain contour data of the second predetermined area based substantially on the established geographical location and latitude and longitude boundaries of the first predetermined area.

12. The system of claim 1 including a third unit coupled to the second unit for defining a safe flight volume forward the aircraft based on the identified object profiles of the first predetermined area.

13. The system of claim 12 wherein the aircraft is an unmanned air vehicle (UAV) including a flight control director unit for autonomous control of the UAV based on the safe flight volume data from the third unit.

14. The system of claim 12 including an air-to-air collision avoidance system for determining other aircraft in a volume of space surrounding the aircraft, said collision avoidance system being coupled to the third unit for use in defining the safe flight volume.

15. The system of claim 12 including a laser obstacle avoidance system for detecting obstacles in proximity to the flight path of the aircraft, said laser obstacle avoidance system coupled to the third unit for use in defining the safe flight volume.

16. The system of claim 1 including a laser wind speed sensor for determining the wind speed surrounding the aircraft for use in the guidance and control of the aircraft.

17. The system of claim 1 wherein the second unit is operative to integrate the data of the first and second predetermined areas to form composite terrain and object on terrain data for use in the guidance and control of the aircraft.

18. The system of claim 17 wherein the aircraft is an unmanned air vehicle (UAV) including a flight control director unit for autonomous control of the UAV based on the composite terrain and object on terrain data from the second unit.

19. The system of claim 1 including a third unit for identifying a target concealed by a common object on the terrain forward the aircraft, said third unit being operative to collect return data profiles of said common object from each of a plurality of different approach aircraft flight paths and to integrate said return data profiles to form a composite three dimensional image of said common object from which to identify said concealed target.

20. A laser-based system disposed on-board an aircraft for identifying a target concealed by a common object on the terrain from a plan view of the common object from the aircraft during flight, said system comprising:
a forward looking cross track laser altimeter operative to emit pulsed laser beams at a predetermined rate along line swept paths forward and downward at a predetermined angle to the flight path of the aircraft, said pulsed laser beams being line swept back and forth across a ground track forward the aircraft and as the aircraft moves along its flight path, said line sweeps serpentining an area of terrain forward the aircraft, said laser altimeter for receiving returns of said pulsed laser beams from said common object, said target concealed thereby and surrounding terrain in said area forward the aircraft;
said laser altimeter operative to measure times-of-flight and line sweep positions of said returns and generate for each return a data profile comprising range and line sweep position thereof based on the corresponding time-of-flight and position measurements, said data profiles being output from the laser altimeter; and
a first unit coupled to the laser altimeter for receiving said return data profiles and for assembling the data profiles of a predetermined number of consecutive line sweeps to form composite data of a three-dimensional image of said common object and target concealed thereby for each of a plurality of different approach flight paths, wherein each three-dimensional image providing a view orientation of said common object and target concealed thereby based on the corresponding approach flight path associated therewith;
said first unit for integrating the composite data of said different viewed three-dimensional images to form a comprehensive three dimensional image of the common object and target concealed thereby, and for identifying the concealed target from said comprehensive three dimensional image.

21. The system of claim 20 wherein the first unit is operative to receive a signal representative of aircraft position in latitude and longitude and to determine a geographic location of the common object based on the aircraft position signal and data profiles of the common object; and wherein the first unit is operative to assemble the data profiles of the predetermined number of consecutive line sweeps to form composite data of the three-dimensional image of the common object and target concealed thereby for each of a plurality of different approach flight paths based on the geographic location determined for the common object.

22. The system of claim 21 including a GPS receiver for providing the signal representative of the aircraft's position.

23. The system of claim 20 wherein the common object comprises a tree and the target is concealed under a canopy of the tree.

24. A self-contained, laser altimeter disposable on-board an aircraft for profiling objects on terrain forward of the aircraft during flight, said laser altimeter comprising:
a laser source for generating pulsed laser beams at a predetermined rate;
a first configuration of optical elements for guiding the pulsed laser beams along a first optical path and including an optical element configurable to direct the pulsed laser beams from the first optical path to paths forward and downward at a predetermined angle to the flight path of the aircraft, wherein the pulsed laser beam paths are guided along a path on the terrain forward the aircraft;
said optical element for receiving returns of said pulsed laser beams from the terrain and objects on the terrain along said terrain path forward the aircraft and directing said returns along a second optical path;
a light detector;
a second configuration of optical elements for guiding said returns from said second optical path to said light detector which produces a return signal in response to a detection of each return;
a first circuit coupled to said light detector and governed by the return signals for measuring times-of-flight of said returns and generating time-of-flight signals corresponding thereto;
a second circuit coupled to said first circuit for generating data profiles for the returns, each data profile comprising a range based on the time-of-flight signal of the corresponding return;
a small enclosed housing including a windowed area;
wherein said above recited elements are packaged within said small enclosed housing; and
wherein the pulsed laser beams and returns are passed respectively from and to said housing through said windowed area.

25. The laser altimeter of claim 24 wherein the second circuit is operative to receive a signal representative of aircraft position in latitude and longitude and to include the aircraft's position in the data profiles.

26. The laser altimeter of claim 24 wherein the second circuit is operative to receive a signal representative of the inertial state of the aircraft and to include the aircraft's inertial state in the data profiles.

27. The laser altimeter of claim 24 including a beam expander disposed in the first optical path for expanding the beam by a predetermined magnification.

28. The laser altimeter of claim 27 wherein the beam expander includes optical elements folded into a penta-prism configuration.

29. The laser altimeter of claim 24 wherein the first and second configurations of optical elements are fixedly aligned in a mono-static configuration.

30. The laser altimeter of claim 24 wherein the first configuration of optical elements guides a portion of the pulsed laser beams along an optical path to the light detector which produces initial signals in response thereto; and wherein the first circuit is governed by the initial and return signals for measuring times-of-flight of said returns.

31. The laser altimeter of claim 24 wherein the elements of the laser altimeter are packaged compactly within the small enclosed housing.

32. The laser altimeter of claim 24 wherein the enclosed housing is mountable to the skin of the aircraft in an orientation in which the windowed area is directed downward towards the terrain.

33. The laser altimeter of claim 24 wherein the optical element is configurable to direct the pulsed laser beams along a path directly downward from the aircraft; and wherein the optical element receives returns of the pulsed laser beams from the terrain and objects on the terrain directly below the aircraft.

* * * * *